June 2, 1925.  
E. LYTTON  
1,540,173  
FRICTION CLUTCH  
Filed Oct. 31, 1922
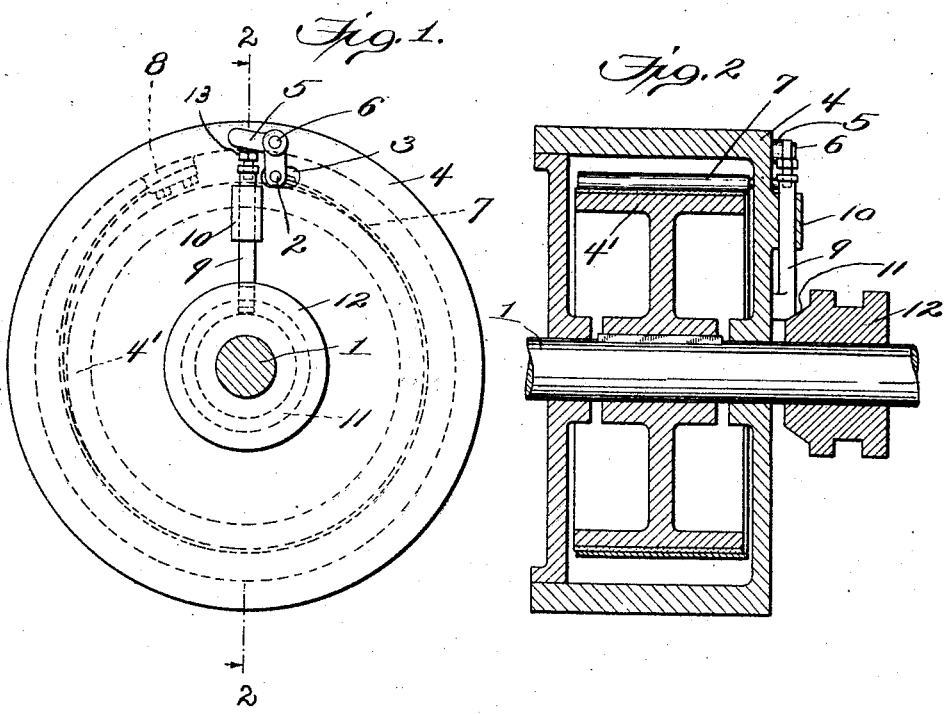
Inventor  
Edward Lytton Patented June 2, 1925.

1,540,173

UNITED STATES PATENT OFFICE.

EDWARD LYTTON, OF LONDON, ENGLAND.

FRICTION CLUTCH.

Application filed October 31, 1922. Serial No. 598,167.

*To all whom it may concern:*

Be it known that I, EDWARD LYTTON, a subject of the King of Great Britain, residing in London, England, have invented certain new and useful Improvements in Friction Clutches, of which the following is a specification.

This invention relates to that kind of friction clutch which comprises two co-acting elements one being a hollow drum, fly wheel or like member that surrounds a disc or like member constituting the other co-acting element, one or other of the two elements being keyed to a rotating or driving shaft, and the two elements or members being capable of being clutched together by means of a clutch band that is secured at one end to one of the members and can be made to grip the other member, and also comprises means for tightening the band about the latter member when the two co-acting members are to be clutched together.

The invention consists in improved means for thus tightening the clutch band.

According to the invention the clutch band, secured at one end to one of the co-acting members, has its other end attached to one end of an arm or pin that passes through a slot formed in the end of the drum and has its other end fixed to a lever pivoted on the outer face of that drum end, a collar mounted to slide on the shaft being provided for causing the lever to move, when desired, about its pivot and in a manner to shift the pin along the slot provided in the drum end and thereby to operate the clutch band. When the pin is moved along the slot in one direction, or backwards with respect to the rotary motion of the driving shaft, it releases the grip of the band on the other member, thereby allowing the member keyed to the shaft to rotate freely, and, when the pin is moved in the reverse direction, or forwards, it applies tension to the band around the member to be gripped so that the latter becomes frictionally coupled to the other co-acting member which will thereupon rotate, if it be mounted to rotate. The latter member may, however, be of a fixed or stationary character instead of being mounted to rotate.

The invention will be further described with reference to the accompanying drawing which illustrates a way in which it can be carried out in which—

Fig. 1 is an end view of the improved clutch, and

Fig. 2 is a section on the line 2, 2 in Fig. 1 looking in the direction of the arrows.

In the drawing, 1 denotes a rotatable driving shaft and 2 a pin which extends through a slot 3 in the end of the drum 4, the pin 2 being connected at one end to a two-arm or bell crank lever 5 pivoted at 6 on the end of the drum 4 and the other end of the pin being attached to one end of a clutch band 7 which may be of steel or other appropriate material and which extends around a pulley 4' keyed to the shaft 1. The other end of the band may be secured in any suitable manner, as at 8, to the inner surface of the drum 4. The lever 5 can be made to turn on its pivot to operate the clutch band 7 by means of a bar 9 which is adapted to be moved in a guide 10 (by the agency of the collar 12 with its coned extension 11 sliding on shaft 1) into engagement with one arm of lever 5, the other arm of the lever being connected with pin 2. The end of the bar 9 may carry an adjustable stop 13 arranged to engage the lever 5 when the bar 9 is operated. When the lever 5 is turned on its pivot the band 7 will be caused to frictionally engage the pulley 4' or other member to be driven.

Having thus described the nature of the said invention and the best means I know of carrying the same into practical effect, I claim:—

In a friction clutch of the kind herein referred to, a driving shaft having a driving member keyed thereto, a driven drum member having a slotted end, a clutch band extending round the driving member and having one of its ends secured to the driven drum, a two arm lever pivoted on one end of the drum, a pin having one of its ends fixed to one arm of the lever, said pin projecting laterally from the lever and through the slotted end of the driven drum and having its other end connected to the second end of the clutch band, and means for rocking the lever on its pivot and moving said pin along the slot for causing the clutch band to grip the driving member, said means comprising a collar slidably mounted on the driving shaft and having a coned extension, a guide on said drum end, and a bar traversing the guide, said bar having its ends engaging, respectively, said coned extension and the second arm of the lever.

In testimony whereof I have signed my name to this specification.

EDWARD LYTTON.